United States Patent
Simpson

(10) Patent No.: US 6,530,580 B1
(45) Date of Patent: Mar. 11, 2003

(54) SUSPENSION ASSEMBLY RELATED APPLICATION

(76) Inventor: John Edward Simpson, 5 Silverwattle Ct., Tallai, Queensland 4213 (AU)

( * ) Notice: Subject to any disclaimer, the term of this patent is extended or adjusted under 35 U.S.C. 154(b) by 220 days.

(21) Appl. No.: 09/707,282

(22) Filed: Nov. 6, 2000

Related U.S. Application Data

(63) Continuation-in-part of application No. 09/310,290, filed on May 12, 1999, now abandoned.

(51) Int. Cl.$^7$ .................................................. B60P 1/18
(52) U.S. Cl. ............................ 280/6.151; 280/43.12; 280/43.17
(58) Field of Search ................. 280/6.151, 43, 280/43.11, 43.12, 43.17, 124.129, 124.133; 180/209; 414/495

(56) References Cited

U.S. PATENT DOCUMENTS

| | | | |
|---|---|---|---|
| 2,957,594 A | 10/1960 | Evans | .......................... 214/506 |
| 3,044,646 A * | 7/1962 | Sperow | |
| 3,113,686 A * | 12/1963 | Sundin | |
| 3,214,185 A | 10/1965 | Mason et al. | ................. 280/6.1 |
| 4,132,432 A | 1/1979 | Raidel | .......................... 280/711 |
| 4,619,578 A | 10/1986 | Routledge | ..................... 414/498 |
| 4,693,486 A | 9/1987 | Pierce et al. | ..................... 280/80 |
| 4,749,210 A | 6/1988 | Sugasawa | ..................... 280/707 |
| 4,934,733 A | 6/1990 | Smith et al. | ................. 280/711 |
| 4,966,387 A | 10/1990 | White, IV | ..................... 280/712 |
| 5,366,237 A | 11/1994 | Dilling et al. | .............. 280/711 |
| 5,540,322 A | 7/1996 | Foster | ..................... 198/750.3 |
| 5,560,639 A | 10/1996 | Nowell et al. | .............. 280/704 |

FOREIGN PATENT DOCUMENTS

| | | | | |
|---|---|---|---|---|
| DE | WO 9000124 | 1/1990 | | ........................ 1/64 |
| EP | 0645293 | 3/1995 | | ........................ 3/20 |
| FR | 2252232 | 6/1975 | | ........................ 1/18 |
| WO | WO 9311953 | 6/1993 | | ..................... 11/26 |

* cited by examiner

*Primary Examiner*—Paul N. Dickson
(74) *Attorney, Agent, or Firm*—Bourque & Associates, P.A.

(57) ABSTRACT

A lowerable suspension assembly for the deck of a vehicle is elevated and lowered by air springs between a travel position when the deck is horizontally disposed and a loading and unloading position when the deck is inclined and one end is in contact with a supporting ground surface.

8 Claims, 11 Drawing Sheets

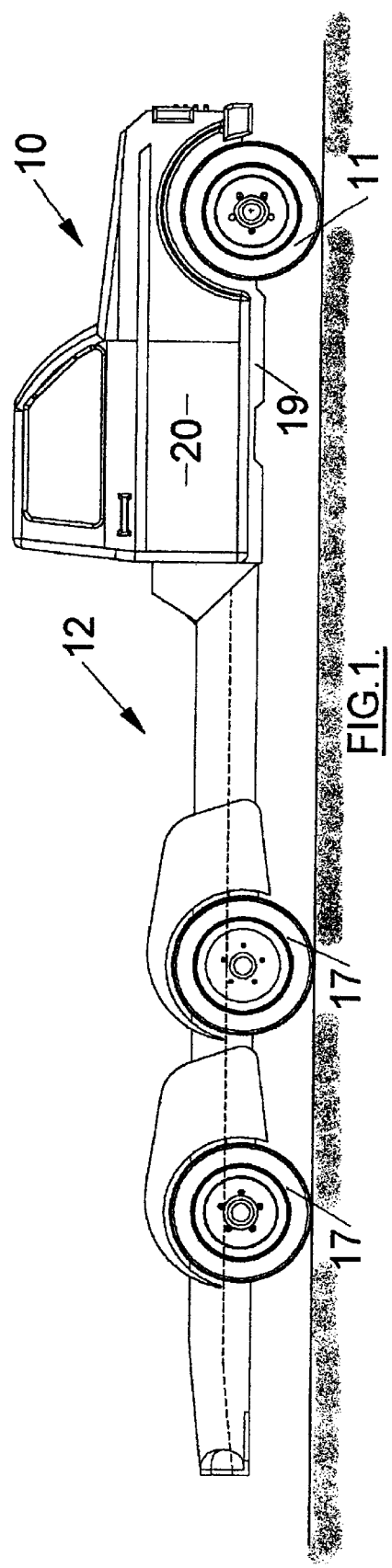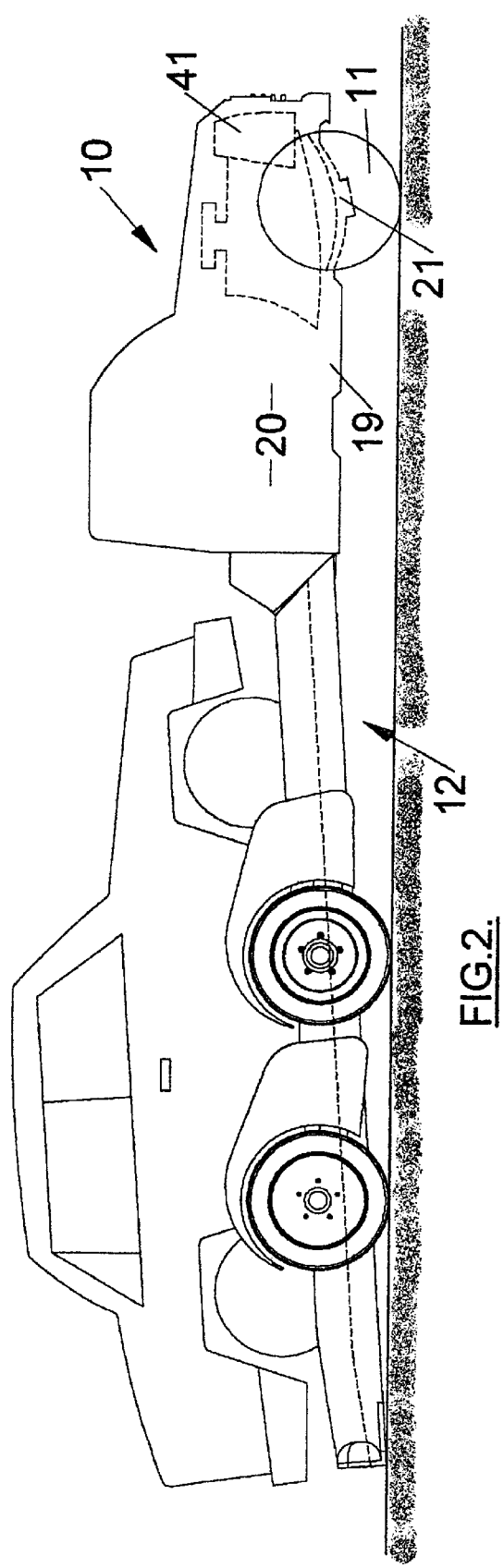

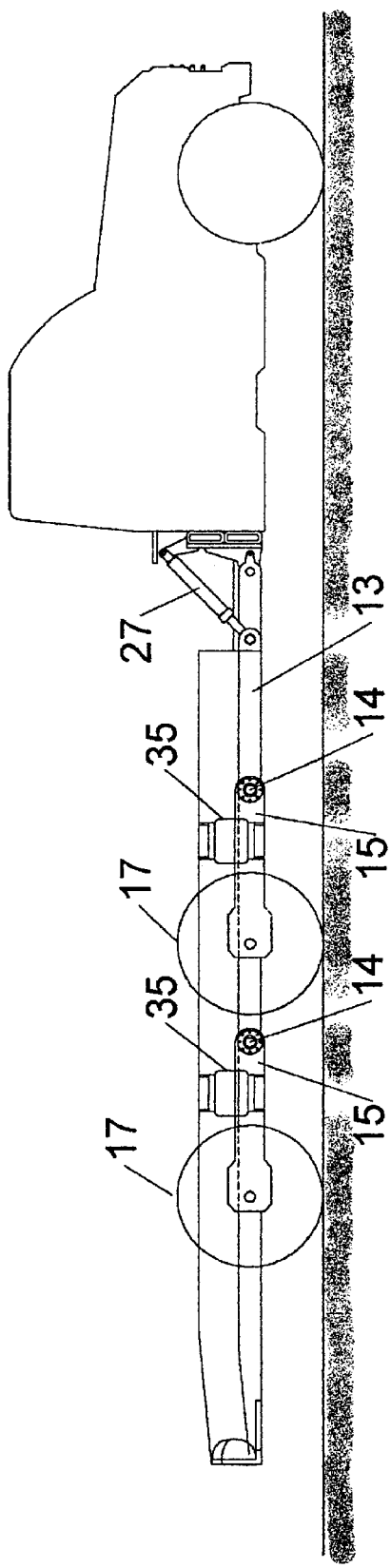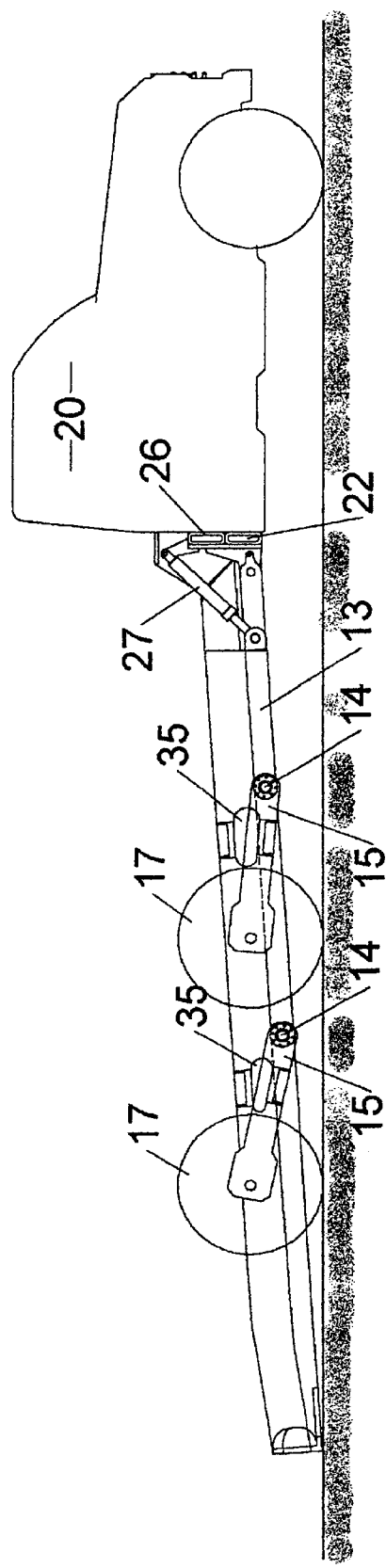

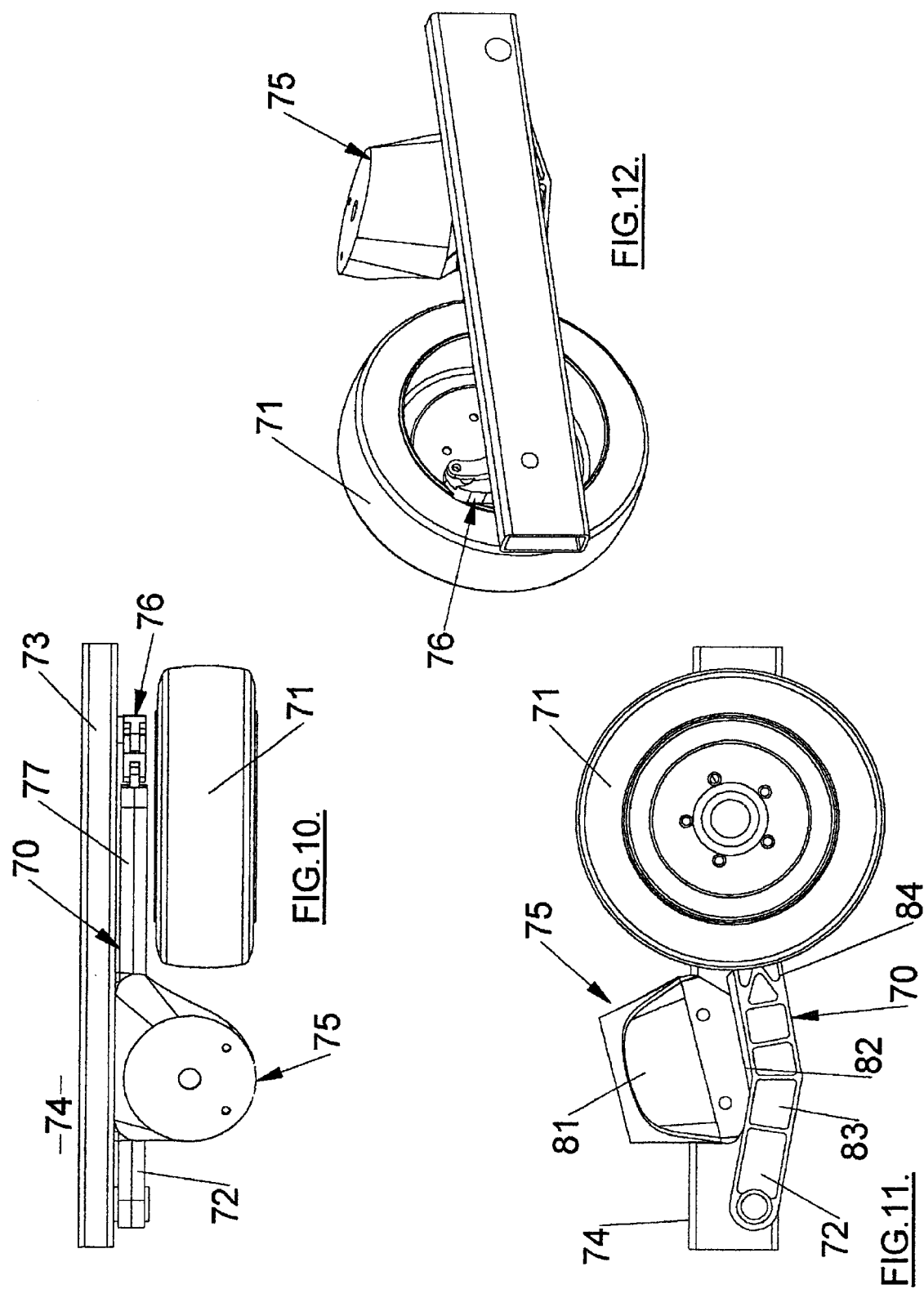

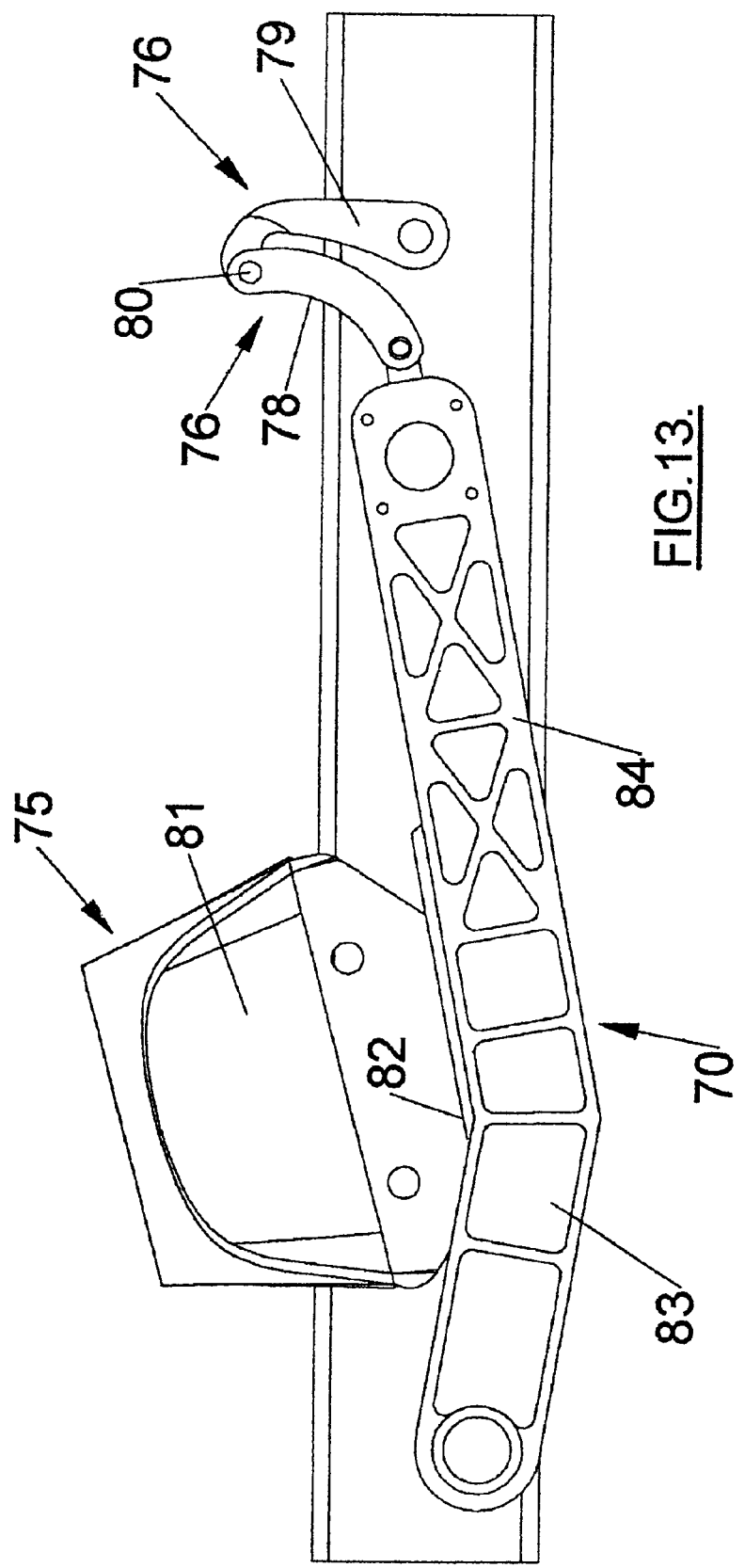

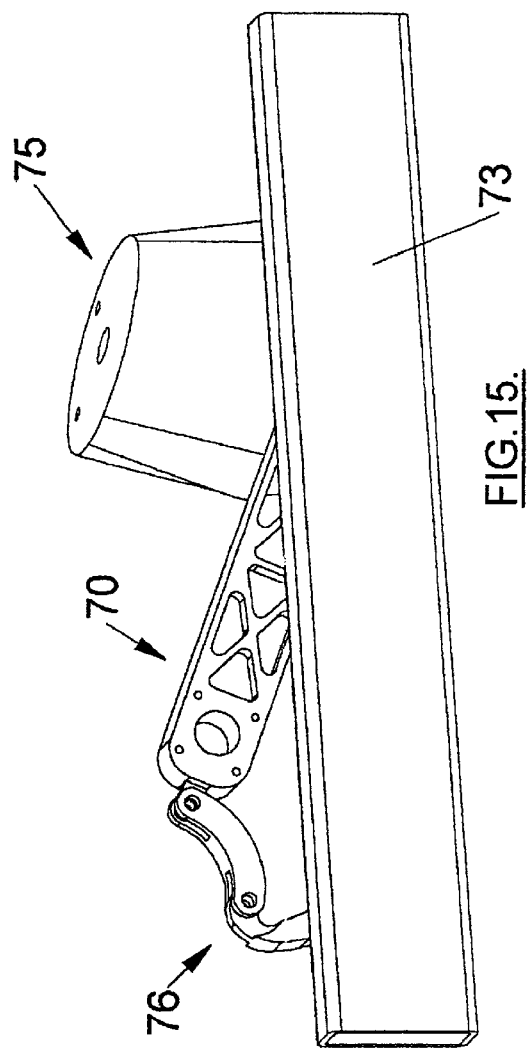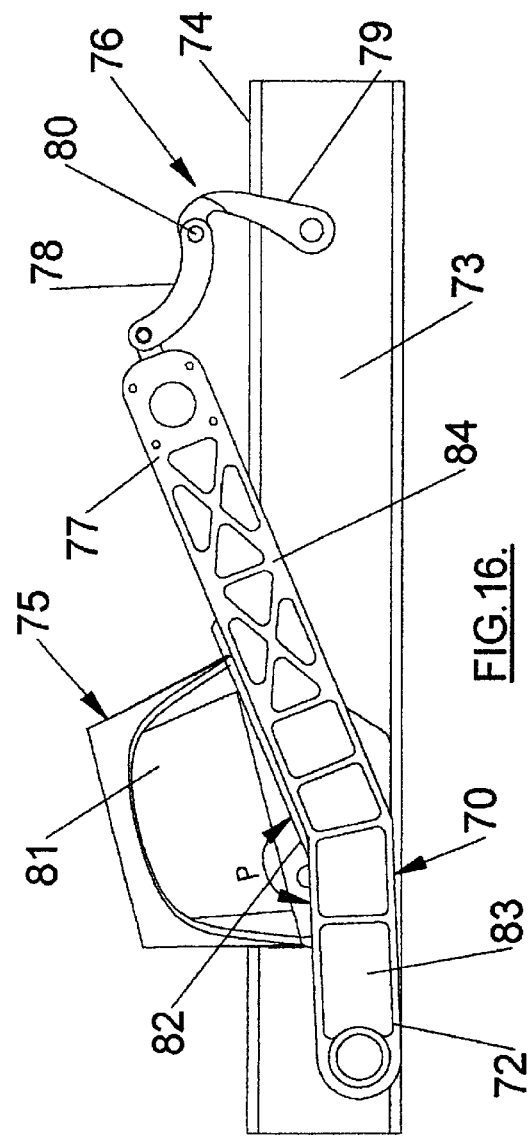

SUSPENSION ASSEMBLY RELATED APPLICATION

RELATED APPLICATION

This application is a continuation-in-part of U.S. patent application Ser. No. 09/310,290 which was filed May 12, 1999 now abandoned.

This invention relates to a suspension assembly for a vehicle.

The invention also extends to a suspension assembly and chassis for a vehicle and a vehicle incorporating these features.

This invention relates particularly but not exclusively to a suspension assembly for a low loading truck, e.g., which permits lowering of a load platform towards the ground for loading/unloading purposes. The load platform is then raised to the appropriate level during normal ride and travel of the vehicle. It will be convenient to hereinafter describe the invention with reference to this example application, however it is to be clearly understood that it is capable of broader application.

Trucks typically have a chassis mounted on four or more wheels. An operator's cabin is mounted on the chassis towards the front of the vehicle and a load platform is mounted on the rear of the chassis. Typically a fuel driven engine, e.g., a diesel engine, drives steerable front wheels to move the vehicle.

Typically forklifts and other lifting devices are used for lifting loads on to the elevated load platform/tray of these trucks. This requires a large amount of work as the load platform is generally positioned a substantial height above the support surface. Further the lifting and lowering operation is a fairly hazardous operation particularly for heavy articles.

Some attempts have been made to modify trucks to ease or facilitate the loading operation. For example some trucks have tilt down tail portion which can be used to load articles on to the support surface. Articles to be loaded are pushed up or down the inclined tail portion to load the goods on to the load platform. The tail portion is then raised for normal travel and use of the truck.

Other attempts to address this problem of which the applicant is aware provide part of the load platform as an elevator such that articles may be loaded on to the elevator adjacent ground level and subsequently elevated by the elevator to the level of the load platform. The articles may then be transferred horizontally to any desired part of the load platform. Whilst such arrangements do provide some means for raising the load to load platform they do not provide a loading tray which may be readily disposed adjacent ground level to facilitate loading or unloading which is preferred.

Clearly it would be advantageous if a contrivance could be provided which enabled the load platform to be lowered for loading/unloading and then raised to its normal height for normal travel of the vehicle.

According to the present invention there is provided a lowerable suspension system for a vehicle deck comprising;
  (a) a swing arm mounting a road wheel having a first end adapted for pivotal connection to the side of a vehicle deck,
  (b) a tower connected to the vehicle deck adjacent a central position of the swing arm,
  (c) a shackle arm pivotably connected to a second end of the swing arm and the deck, said shackle arm comprising two links joined by a neutral pivotal connection which are pivotably connected to the deck and to the second end of the swing arm,
  (d) an air spring adapted to be interposed between the tower and the central portion of the swing arm, the arrangement and construction being such that in a first position with the air spring fully inflated the vehicle deck is horizontally disposed for normal travel and in a second position with the air spring deflated the deck is in a lowered position enabling loading and unloading to and from the deck from the ground to take place.

The swing arm and the links can be cranked.

The cranks of the links can be opposed.

The medial portion of the swing arm provides a seat for a lower end of the air spring.

First and second ends of the swing arm can be inclined with respect to one another at an angle between 145 and 155 degrees.

The first and second links of the shackle arms can be substantially arcuate.

Wherein the tower which provides a contact mounting surface for the top surface of the air spring is inclined at between 5 to 12 degrees from the plane of the deck.

According to a further aspect of the present invention there is provided a lowerable suspension system aforesaid and coupling means for attachment to a driver vehicle said attachment means including a pivotal connection between the driver vehicle, and means for locking and releasing the pivotal connection.

A chassis and suspension assembly and a vehicle in accordance with this invention may manifest itself in a variety of forms. It will be convenient to hereinafter describe in detail several preferred embodiments of the invention with reference to the accompanying drawings. The purpose of providing this detailed description is to provide an enabling disclosure. It is to be clearly understood however that the specific nature of this description does not supersede the generality of the preceding broad description in the drawings:

FIG. 1 is a side view of a typical embodiment of the invention in a normal travelling position;

FIG. 2 is a side view similar to FIG. 1 but with the suspension means retracted to a loading attitude;

Figure 3:
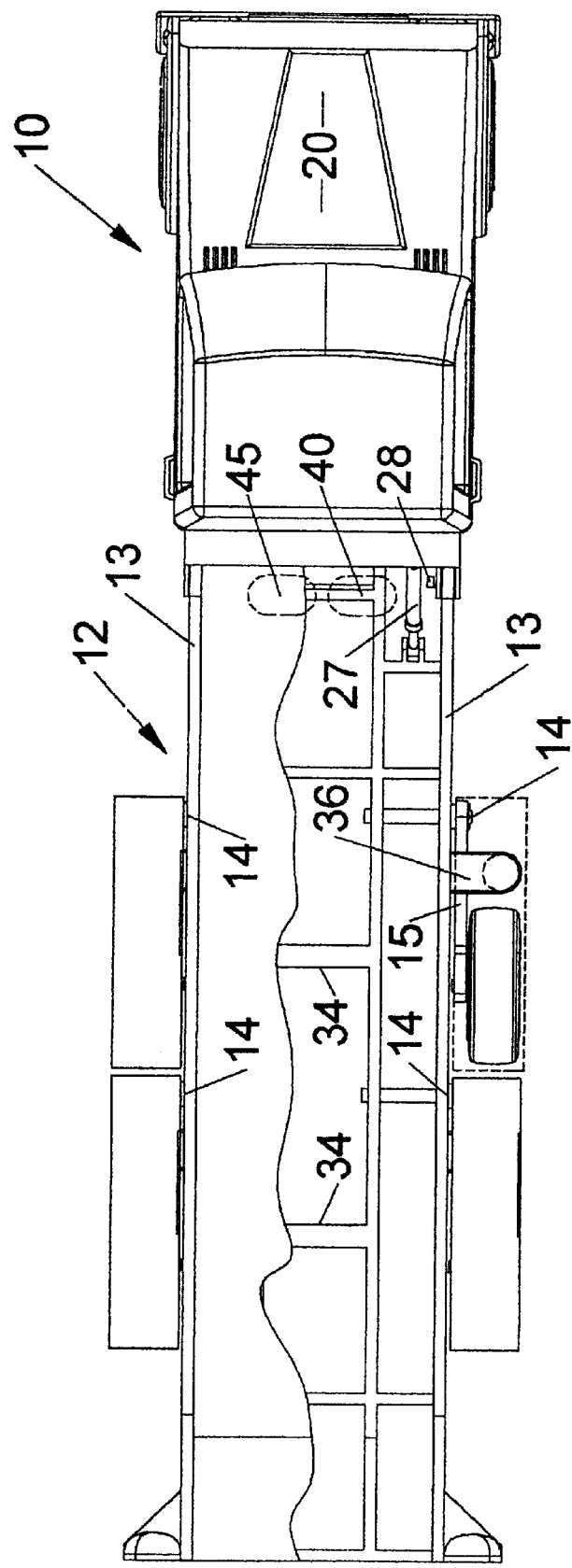
FIG. 3 is a plan view of the embodiment of the invention illustrated in FIG. 1 and shown partially cut-away.
Figure 6:
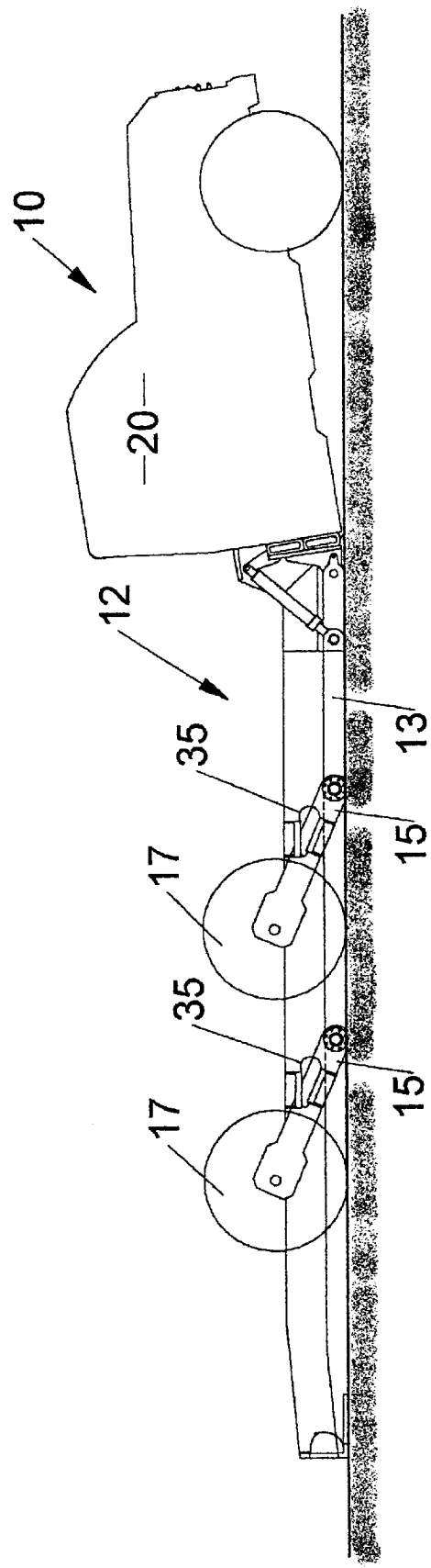
Figure 7:
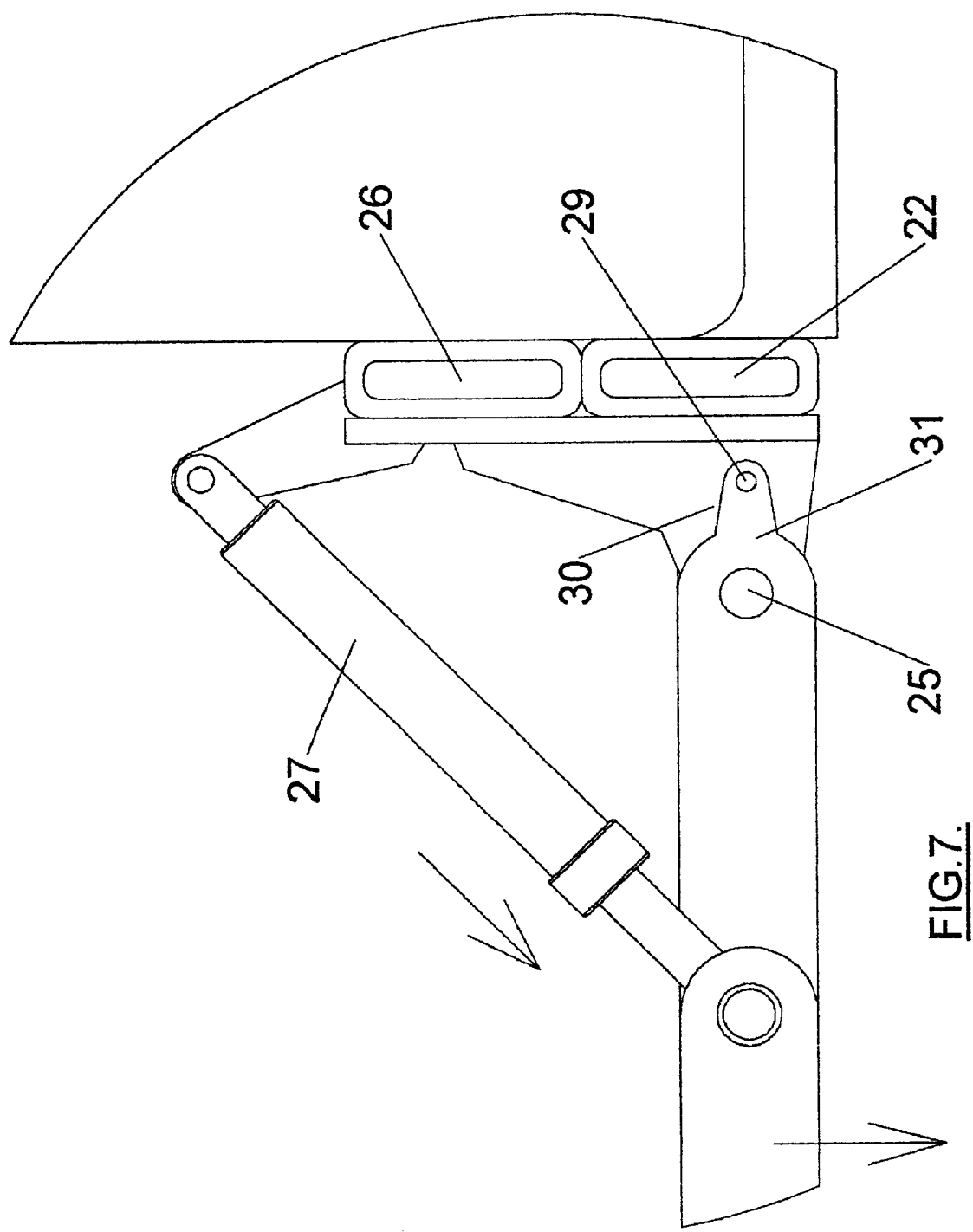
Figure 8:
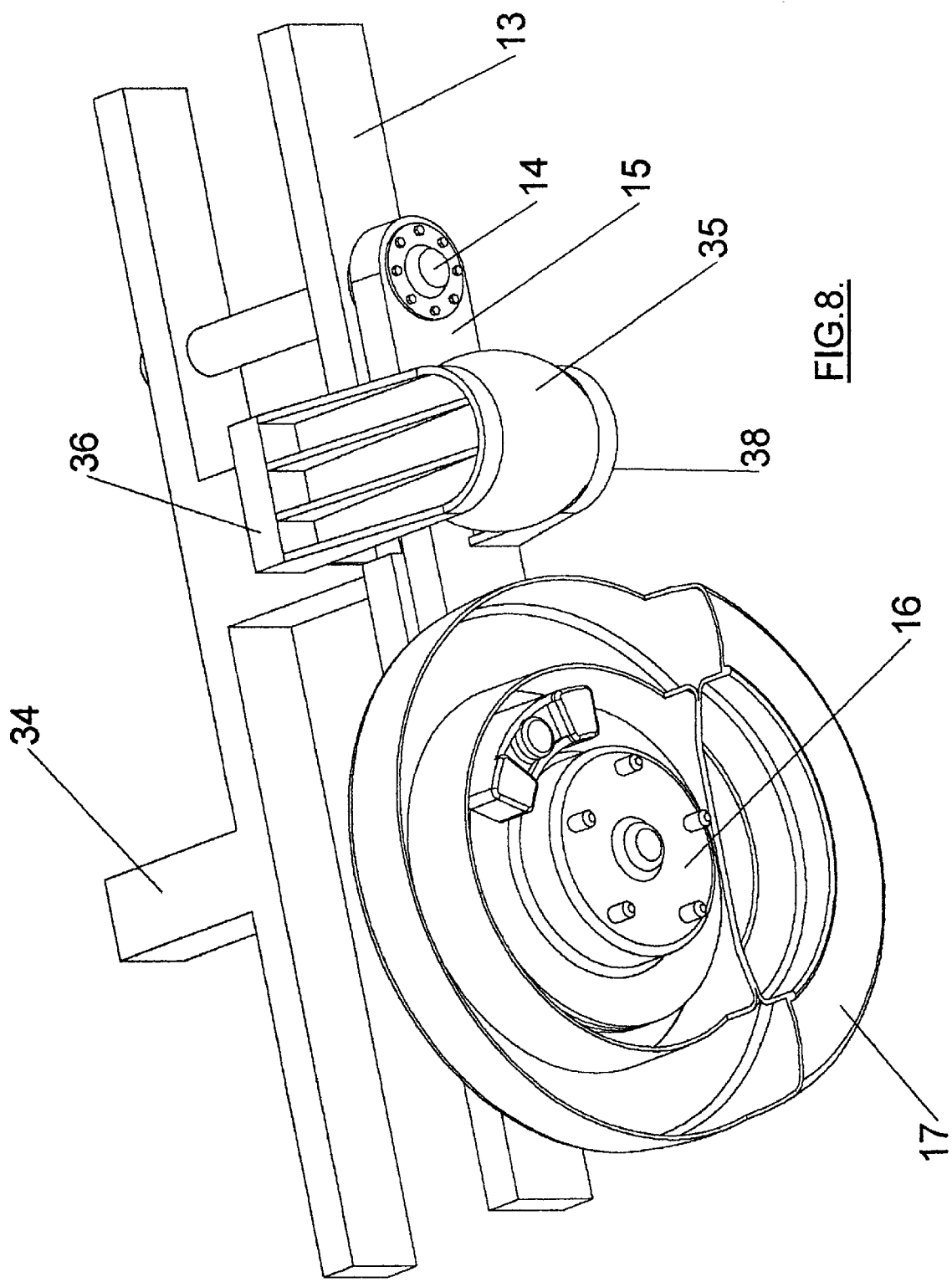
Figure 9:
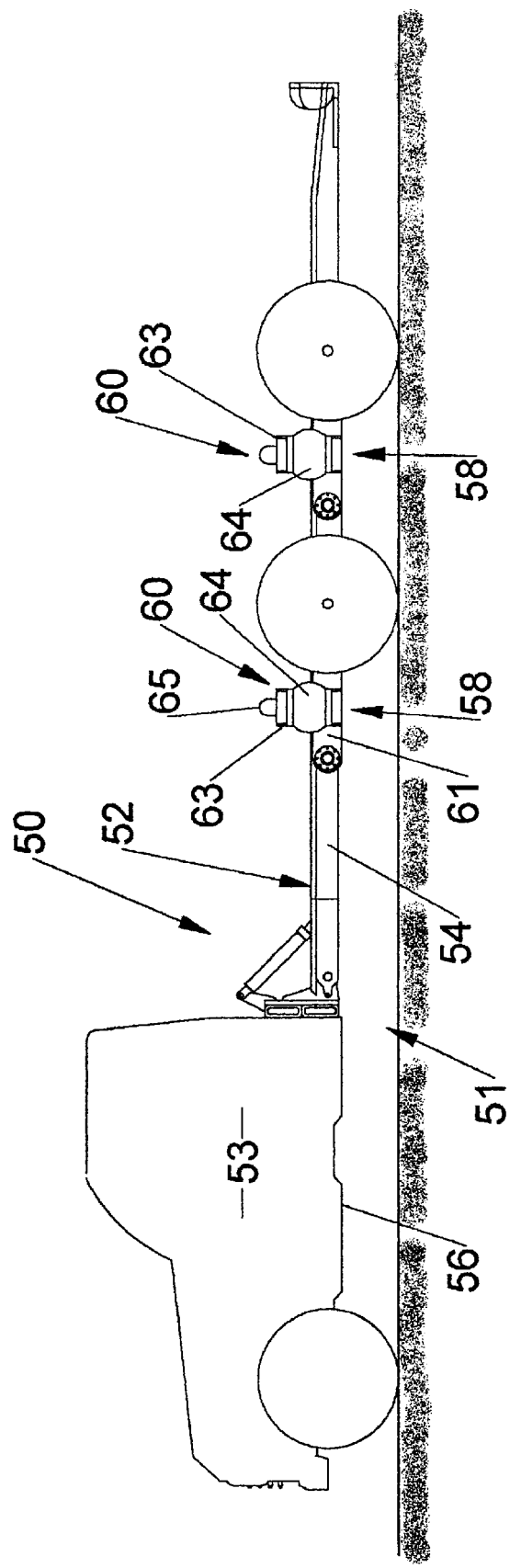
Figure 14:
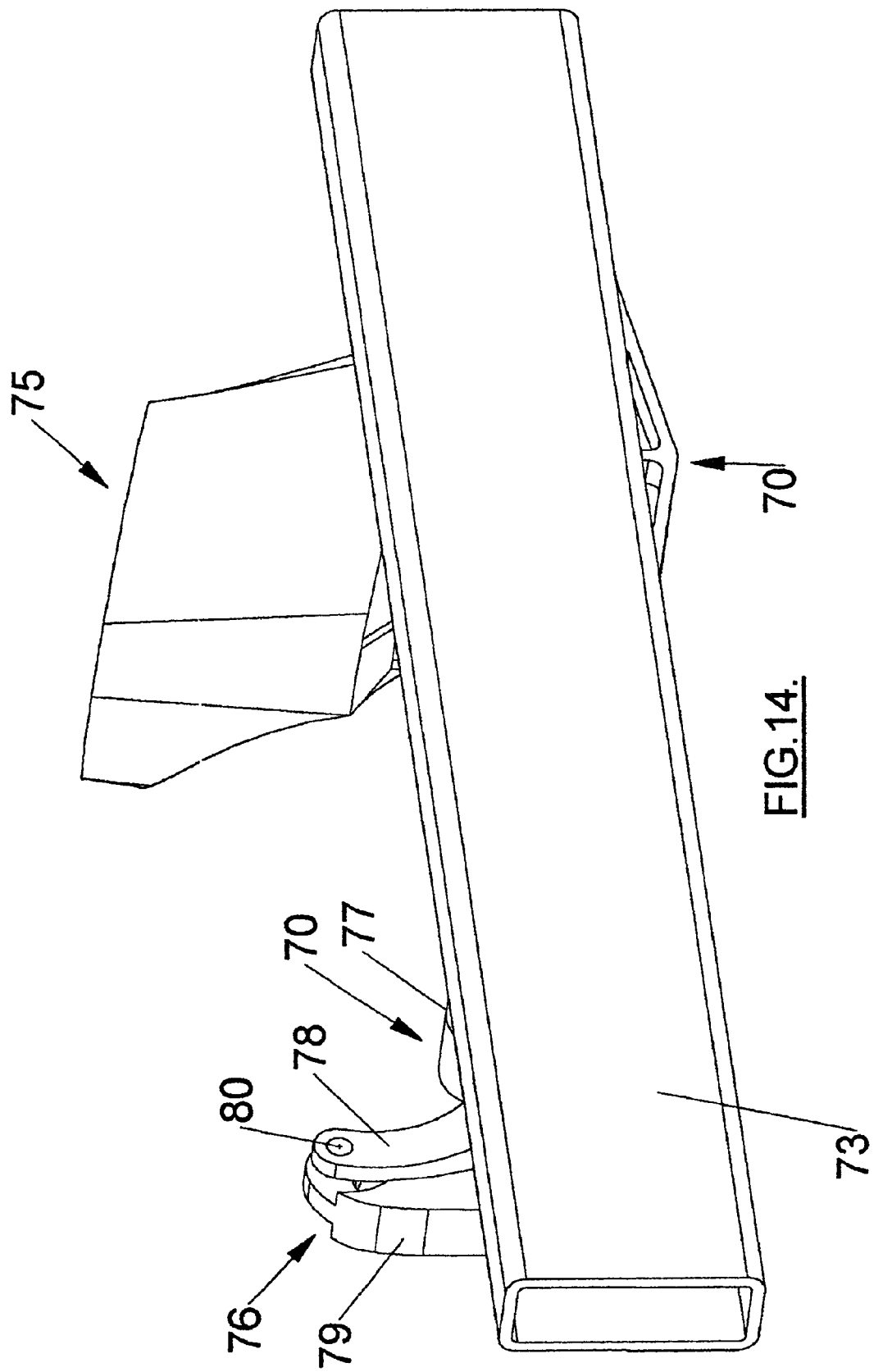

FIGS. 4 and 5 correspond to FIGS. 1 and 2 but illustrate the operation of the suspension components;

FIG. 6 is a similar view to FIG. 5 but shows the load platform further lowered by pivoting about its connection with the operators cabin;

FIG. 7 illustrates the pivotal connection between existing and new chassis rails;

FIG. 8 is a cut-away perspective view of a suspension and wheel assembly;

FIG. 9 is a side view of an alternate fixed chassis form of the invention;

FIG. 10 is a top plan view is a suspension assembly and part of a chassis in accordance with another embodiment of the invention in a sprung raised position;

FIG. 11 is a side view of the suspension assembly of FIG. 10;

FIG. 12 is a side view of the suspension assembly of the other (inner side) of the chassis rail;

FIGS. 13 and 14 are enlarged views of the suspension assembly of FIG. 10 taken from opposite sides of a chassis side rail with the road wheel removed; and FIGS. 15 and 16 are side views from opposite sides of a chassis side rail with the suspension assembly in a lowered position. In both cases the position of the road wheel is shown in broken outline.

The truck 10 illustrated in FIG. 1 is configured as a low loading truck according to the present invention. The truck has steerable driven front wheels 11 and a load platform 12 supported by rear chassis rails 13. These rails 13 provide trunnion mountings 14 for respective trailing suspension arms 15 pivotally suspended from the trunnion mountings 14. The arms 15 support wheel mountings 16 at their outer ends on which the rear wheels 17 are supported.

The load platform 12 extends rearwardly from the operators cabin 20 of a conventional four wheel drive vehicle such as a truck or utility, both of which are referred to as a truck herein, in which the chassis 19 rearwardly of the cabin 20 along with the rear wheel drive has been removed. The removed portion of the chassis 19 is replaced by the loading platform 12 such that only the operators cabin including the front suspension 21 supporting the steerable front wheels 11 and the engine remains in another possible arrangement (not shown) the cabin can be at the rear of the loading platform.

The new chassis rails 13 are interconnected at their front ends to a cross-member 22 which mounts pivotally at 25 to a corresponding cross-member 26 fixed to the rear ends of the cut-away chassis rails 19. A hydraulic ram 27 controls the pivotal movement between the cross-members 22 and 26 and a further ram 28 controls the operation of locking pins 29 which extend laterally through apertures 30, in brackets mounted on the respective cross-members 22 and 26, when the vehicle 10 is in its normal travelling attitude.

In this embodiment the load platform is supported by a pair of wheels at each side of the platform 12. However it could be supported by a single wheel at each side if desired or multiple wheels. As illustrated the opposed chassis rails 13 are interconnected by transverse members 34 which extend across the load platform 12 adjacent the location of the trunnion mountings 14 from the suspension arms 15. The transverse members 34 provide lateral stiffness to the trunnion mountings.

It will be seen that the arms 15 lie closely adjacent the outside face of the respective chassis rails 13 and support the wheels 17 with minimum clearance from the arm 15 so that the overall width of the load platform adjacent the wheels may be maximised while keeping the overall width across the rear wheels within legal limits.

Each trailing arm 15 independently pivotable about its trunnion mounting 14 and may pivot from a normal sprung or raised driving position, as shown in FIG. 1 to a retracted or lowered position, as shown in FIG. 2, at which the load platform 12 is lowered between the wheels 17 towards the ground.

Referring to FIG. 8 it will be seen that each trailing arm 15 is supported by an air spring assembly 35 supported at its upper end by a tower 36 fixed to the chassis rail 13 and on a platform 38 on the arm 15 at its lower end in front of the wheel 17. The air spring 35 is inflated to elevate the load platform 14 to its operative position and provides a resilient support during the elevated travelling position. The air spring 35 is supplied with air from a storage tank 40 having sufficient storage capacity to provide quick inflation of all air springs and elevation of the load platform 14 from an on ground position to a travelling position. As an alternative to the air spring 35 a mechanical or hydraulic receprocable device may be employed.

An air compressor 41 is mounted in the engine bay of the operators cabin 20 for recharging the tank 40 as is the hydraulic pump for the rams 27 and 28. A further two stage hydraulic ram may be connected between the tower 36 and the platform 38 to provide additional lift for quickly elevating the load platform and for providing a back-up support for the load platform. As an alternative to hydraulic rams or air, mechanical or other hydraulic systems may be adopted.

Controls for the air supply to the air bags 35 and for the hydraulic fluid supply for the rams are located in the operators cabin 20 and if desired duplicate controls may be provided for operation externally of the cabin 20. A fuel tank 45 and the air storage tank 40 are mounted in the space immediately at the front of the load platform 12.

As illustrated in FIGS. 2 and 6, the load platform 12 may be lowered to an inclined loading position by retraction of the rear suspension means 15. The load platform 12 may be lowered to a horizontal on-ground loading position by retraction of the rear suspension means 15 and operation of the hydraulic rams 27 and 28 to pivot the load platform relative to the operators cabin 20.

The embodiment 50 illustrated in FIG. 9 has a fixed connection 51 between the load platform 52 and the operators cabin 53. However in this embodiment the rear chassis rails 54 are stepped downwardly from the original chassis rails 56 of the operators cabin 57 so that the retraction of the suspension means 58 will pivot the load platform 52 about the front wheels and place the platform 52 close to the ground. This embodiment may be more suited to a relative short wheel base vehicle such as a utility.

The air springs 60 of this embodiment are two part single or double action air springs having a relatively short displacement low stiffness suspension portion 63 and a relatively large displacement high stiffness portion 64. Each pneumatic spring assembly 60 is connected between the respective trailing arm 61 and an upper mounting 65 supported by the chassis rails 54, such that when the large displacement portion is deflated, the platform 52 is retracted to move downwardly into engagement with the ground or into close proximity therewith.

For travelling purposes, the large displacement high stiffness pneumatic spring 64 is inflated so that the platform 52 is elevated to a travelling position in which conventional springing will be provided by the small displacement low stiffness portion 63. Separate pneumatic controls are provided in the drivers cabin for the pneumatic spring assemblies so that both the stiffness of the ride and the height adjustment position may be selectively and independently varied to suit the operating conditions. Variations in air pressures will vary the ride and height From the above it will be seen that a conventional four wheel drive truck or utility may be readily converted to a low loading configuration as per the above described embodiments. Suitably the chassis rails, trunnion mountings, trailing arms and suspension units are provided as standard components, such that a variety of four wheel drive vehicles may be readily modified using standard off the shelf components which may be duplicated or used in multiples to accommodate the applied loads expected. For this purpose these components are selected to support the load platform of a four wheel drive utility and thus must be used in multiples for larger vehicles. This will facilitate cost effective conversion of four wheel drive utilities or trucks to front wheel drive low loading vehicles.

In the embodiment illustrated in FIGS. 1 to 8, the hydraulic rams 27 are not fully retracted in their normal travelling position such that they may be further retracted to elevate the front end of the substitute load platform 12. This may be accompanied by a further elevation of the back of the load platform by the rear suspension to make it parallel to the ground but at a greater height than the normal travelling position so that a high ground clearance position may be provided.

With respect to FIGS. 10 to 16 of the drawings in a further embodiment of the present invention there is provided a lowerable suspension system for a vehicle comprising a swing arm generally indicated by arrow 70 mounting a road wheel 71 having a first end 72 connected to a chassis rail 73 on the side of a vehicle deck 74, a tower generally indicated by arrow 75 connected to the vehicle deck 74 adjacent a central position of the swing arm 70, and a shackle arm generally indicated by arrow 76 pivotably connected to a second end 77 of the swing arm 70 and the deck 74.

The shackle arm 76 comprises two links 78, 79 joined by a neutral pivot connection 80 which are pivotably connected to the chassis pail 73 and the second end 77 of the swing arm.

An air spring 81 is interposed between the tower 75 and a central portion 82 of the swing arm 70.

In a first position with the air spring fully inflated the deck 74 is horizontally disposed for normal road travel and in a second position with the air spring deflated the deck is in a lowered position enabling ramp loading and unloading to and from the deck to take place.

Both the swing arm 70 and the links 78, 79 are cranked, and the cranks of the links 78, 79 are opposed.

The central portion 82 of the swing arm 70 provides a seat for the lower end of the air spring 81.

The crank in the swing arm 70 is created by an inclination 'P' (See FIG. 16) between sections 83 and 84 of between 145 and 155 degrees.

The cranks in each of the links 78 and 79 are substantially arcuate.

The contact mounting surface of the tower 75 is inclined at an angle of between 5 and 12 degrees with respect to the plane of the deck 74.

In the drawings FIGS. 10 to 14 are illustrative of the suspension system supporting the deck 74 in a horizontal position for travel and FIGS. 15 and 16 show the suspension system supporting the deck 74 on an incline when the wheel 71 is above the plane of the deck 74.

In the travel position the air spring is inflated and in the ramp loading position the air spring is deflated.

In the travel position the links 78,79 are clustered and as the air spring is deflated the links expand into a goose-neck configuration.

The suspension system illustrated can be used in pairs for a two wheeled vehicle or in multiple pairs for a vehicle with multiple wheel sets.

The suspension system described in relation to FIGS. 10–15 has many disadvantages in relation to the earlier known embodiments, the main advantages being;

(a) The system allows a deck to be lowered completely to the ground because the assembly is mounted to the outside of chassis rails of the deck, (b) In the lowered position the swing arm assembly is not an encumbrance to lowering of the deck to ground level, (c) The shackle connection is bunched when the deck is in its travelling position and provides lateral support relative to the deck and the free end of the swing arm during travelling, (d) The crank in the spring arm enables optimum operating position to be obtained for the air springs between the deflated and inflated conditions.

The suspension assembly described above provides a simple yet efficacious mechanism for facilitating lowering of the load tray and associated chassis to the road surface to permit loading/unloading of loads. There are no complex components involved and no moving parts. Further the mechanism can be easily operated by a truck driver.

It will of course be realised that the above has been given only by way of illustrative example of the invention and that all such modifications and variations thereto as would be apparent to persons skilled in the art are deemed to fall within the broad scope and ambit of the invention as is defined in the appended claims.

What is claimed is:

1. A lowerable suspension system for a vehicle deck comprising;
    (a) a swing arm mounting a road wheel having a first end adapted for pivotal connection to the side of a vehicle deck,
    (b) a tower connected to the vehicle deck adjacent a central position of the swing arm,
    (c) a shackle arm pivotably connected to a second end of the swing arm and the deck, said shackle arm comprising two links joined by a neutral pivotal connection which are pivotably connected to the deck and to the second end of the swing arm,
    (d) an air spring adapted to be interposed between the tower and the central portion of the swing arm, the arrangement and construction being such that in a first position with the air spring fully inflated the vehicle deck is horizontally disposed for normal travel and in a second position with the air spring deflated the deck is in a lowered position enabling loading and unloading to and from the deck from the ground to take place.

2. A lowerable suspension system as claimed in claim 1 wherein the swing arm and the links are cranked.

3. A lowerable suspension arm as claimed in claim 2 wherein the cranks of the links are opposed.

4. A lowerable suspension system as claimed in claim 1 wherein the medial portion of the swing arm provides a seat for a lower end of the air spring.

5. A suspension system as claimed in claim 1 wherein first and second ends of the swing arm are inclined with respect to one another at an angle between 145 and 155 degrees.

6. A suspension arm as claimed in claim 2 wherein the first and second links of the shackle arms are substantially arcuate.

7. A suspension arm as claimed in claim 1 wherein the tower provides a contact mounting surface for the top surface of the air spring is inclined at between 5 to 12 degrees from the plane of the deck.

8. A vehicle comprising a chassis and deck, a lowerable suspension system as claimed in claim 1 and coupling means for attachment to a driver vehicle said attachment means including a pivotal connection between the driver vehicle, and means for locking and releasing the pivotal connection.

* * * * *